(12) United States Patent
Corfield et al.

(10) Patent No.: US 10,235,992 B2
(45) Date of Patent: Mar. 19, 2019

(54) APPARATUS AND METHODS USING A PATTERN MATCHING SPEECH RECOGNITION ENGINE TO TRAIN A NATURAL LANGUAGE SPEECH RECOGNITION ENGINE

(71) Applicant: nVoq Incorporated, Boulder, CO (US)

(72) Inventors: Charles Corfield, Boulder, CO (US); Brian Marquette, Longmont, CO (US)

(73) Assignee: nVoq Incorporated, Boulder, CO (US)

( * ) Notice: Subject to any disclaimer, the term of this patent is extended or adjusted under 35 U.S.C. 154(b) by 0 days.

(21) Appl. No.: 15/661,550

(22) Filed: Jul. 27, 2017

(65) Prior Publication Data

US 2017/0323634 A1 Nov. 9, 2017

Related U.S. Application Data

(63) Continuation of application No. 13/492,540, filed on Jun. 8, 2012, now Pat. No. 9,767,793.

(51) Int. Cl.

| *G10L 15/26* | (2006.01) |
| *G10L 15/04* | (2013.01) |
| *G10L 15/07* | (2013.01) |
| *G10L 15/32* | (2013.01) |

(52) U.S. Cl.
CPC .............. *G10L 15/07* (2013.01); *G10L 15/32* (2013.01)

(58) Field of Classification Search
CPC ..... G10L 15/14; G10L 15/1815; G10L 15/04; G10L 15/26
USPC ........................................................ 704/235
See application file for complete search history.

(56) References Cited

U.S. PATENT DOCUMENTS

| 4,994,983 A | 2/1991 | Landell et al. |
| 5,165,095 A | 11/1992 | Borcherding |
| 5,732,187 A | 3/1998 | Scruggs et al. |
| 6,070,140 A * | 5/2000 | Tran ..................... G06F 1/3203 |
| | | 704/232 |
| 6,076,054 A | 6/2000 | Vysotsky et al. |
| (Continued) | | |

FOREIGN PATENT DOCUMENTS

WO 02/27712 A1 4/2002

OTHER PUBLICATIONS

PCT Notification of Transmittal of the International Search Report and the Written Opinion of the International Searching Authority, or the Declaration for PCT/US2013/044772, dated Aug. 28, 2013, 9 pages.

*Primary Examiner* — Daniel C Washburn
*Assistant Examiner* — Timothy Nguyen
(74) *Attorney, Agent, or Firm* — Perkins Coie LLP

(57) ABSTRACT

The technology of the present application provides a speech recognition system with at least two different speech recognition engines or a single engine speech recognition engine with at least two different modes of operation. The first speech recognition being used to match audio to text, which text may be words or phrases. The matched audio and text is used by a training module to train a user profile for a natural language speech recognition engine, which is at least one of the two different speech recognition engines or modes. An evaluation module evaluates when the user profile is sufficiently trained to convert the speech recognition engine from the first speech recognition engine or mode to the natural language speech recognition or mode.

12 Claims, 4 Drawing Sheets

(56) References Cited

U.S. PATENT DOCUMENTS

| | | | |
|---|---|---|---|
| 6,363,348 B1* | 3/2002 | Besling | G06K 9/6217 704/251 |
| 6,487,530 B1 | 11/2002 | Lin et al. | |
| 6,490,561 B1 | 12/2002 | Wilson et al. | |
| 6,510,414 B1* | 1/2003 | Chaves | H04M 3/51 379/88.01 |
| RE38,101 E | 4/2003 | Vysotsky et al. | |
| 6,714,910 B1 | 3/2004 | Rose et al. | |
| 6,754,629 B1 | 6/2004 | Qi et al. | |
| 6,820,055 B2* | 11/2004 | Saindon | G06F 17/289 704/235 |
| 7,228,275 B1 | 6/2007 | Endo et al. | |
| 7,668,718 B2 | 2/2010 | Kahn et al. | |
| 7,869,998 B1* | 1/2011 | Di Fabbrizio | G10L 15/22 704/1 |
| 8,370,146 B1* | 2/2013 | Schalkwyk | G10L 15/1815 704/235 |
| 2002/0169606 A1* | 11/2002 | Bantz | G10L 15/063 704/235 |
| 2002/0177999 A1 | 11/2002 | Ortega | |
| 2003/0187645 A1 | 10/2003 | Class et al. | |
| 2004/0215449 A1* | 10/2004 | Roy | G10L 15/08 704/211 |
| 2004/0218751 A1* | 11/2004 | Colson | H04M 3/51 379/265.09 |
| 2005/0159959 A1* | 7/2005 | Benco | H04M 3/5322 704/277 |
| 2006/0095259 A1* | 5/2006 | Bahl | H04M 3/4936 704/235 |
| 2006/0149558 A1* | 7/2006 | Kahn | G10L 15/063 704/278 |
| 2006/0167686 A1* | 7/2006 | Kahn | G06F 17/2211 704/235 |
| 2006/0190250 A1* | 8/2006 | Saindon | G06F 17/28 704/235 |
| 2006/0235686 A1* | 10/2006 | Jeong | G10L 15/32 704/238 |
| 2006/0293901 A1 | 12/2006 | Dharanipragada et al. | |
| 2007/0156400 A1* | 7/2007 | Wheeler | G10L 15/30 704/235 |
| 2008/0208578 A1 | 8/2008 | Geller | |
| 2008/0312926 A1 | 12/2008 | Vair et al. | |
| 2009/0070113 A1* | 3/2009 | Gupta | G10L 15/22 704/257 |
| 2009/0177470 A1* | 7/2009 | Beach | G10L 15/30 704/235 |
| 2009/0271191 A1* | 10/2009 | Marquette | G10L 15/26 704/235 |
| 2009/0271192 A1* | 10/2009 | Marquette | G09B 13/00 704/235 |
| 2009/0300041 A1 | 12/2009 | Schroeter | |
| 2011/0264451 A1* | 10/2011 | Hoepfinger | G10L 15/063 704/235 |
| 2012/0173464 A1* | 7/2012 | Tur | G06F 9/4446 706/11 |

\* cited by examiner

APPARATUS AND METHODS USING A PATTERN MATCHING SPEECH RECOGNITION ENGINE TO TRAIN A NATURAL LANGUAGE SPEECH RECOGNITION ENGINE

CROSS-REFERENCE TO RELATED PATENT APPLICATIONS

This application is a continuation of U.S. patent application Ser. No. 13/492,540 filed Jun. 8, 2012 and entitled "Apparatus and Methods Using a Pattern Matching Speech Recognition Engine to Train a Natural Language Speech Recognition Engine," the disclosure of which is incorporated herein by reference in its entirety.

REFERENCE TO CO-PENDING APPLICATIONS FOR PATENT

None.

BACKGROUND

Field

The technology of the present application relates generally to speech recognition systems, and more particular, to apparatuses and methods to allow for deployment of a speech recognition engine initially using a pattern matching recognition engine that allows for training of and eventual conversion to a speech recognition engine that uses natural language.

Background

Early speech to text engines operated on a theory of pattern matching. Generally, these machines would record utterances spoken by a person, convert the audio into a sequence of possible phonemes, and then find a sequence of words that is allowed by the pattern and which is the closest, or most likely, match to the sequence of possible phonemes. For example, a person's utterance of "cat" provides a sequence of phonemes. These phonemes can be matched to reference phonetic pronunciation of the word "cat". If the match is exact or close (according to some algorithm), the utterance is deemed to match "cat"; otherwise, it is a so-called "no-match". Thus, the pattern matching speech recognition machine converts the audio file to a machine readable version "cat." Similarly, a text to speech engine would read the data "cat", convert "cat" into its phonetic pronunciation and then generate the appropriate audio for each phoneme and make appropriate adjustments to the "tone of voice" of the rendered speech. Pattern matching machines, however, have limitations. Generally, pattern matching machines are used in a speaker independent manner, which means they must accommodate a wide range of voices, which limits the richness of patterns that will provide good matches across a large and diverse population of users.

Pattern matching speech recognition engines are of value because they are deployable and usable relatively rapidly compared to natural language speech recognition. However, as they are not overly robust, pattern matching speech recognition is currently of limited value because it cannot handle free form speech, which is akin to pattern matching with an extremely large and complex pattern.

In view of these limitations, speech recognition engines have moved to a continuous or natural language speech recognition system. The focus of natural language systems is to match the utterance to a likely vocabulary and phraseology, and determine how likely the sequence of language symbols would appear in speech. Determining the likelihood of a particular sequence of language symbols is generally called a language model. The language model provides a powerful statistical model to direct a word search based on predecessor words for a span of n words. Thus, the language model will use probability and statistically more likely words for similar utterances. For example, the words "see" and "sea" are pronounced substantially the same in the United States of America. Using a language model, the speech recognition engine would populate the phrase: "Ships sail on the sea" correctly because the probability indicates the word "sea" is more likely to follow the earlier words in the sentence. The mathematics behind the natural language speech recognition system are conventionally known as the hidden Markov model. The hidden Markov model is a system that predicts the value of the next state based on the previous states in the system and the limited number of choices available. The details of the hidden Markov model are reasonably well known in the industry of speech recognition and will not be further described herein.

Generally speaking, speech recognition engines using natural language have users register with an account. More often than not, the speech recognition engine downloads the application and database to the local device making it a fat or thick client. In some instances, the user has a thin client where the audio is routed to a server that has the application and database that allows speech recognition to occur. The client account provides a generic language model that is tuned to a particular user's dialect and speech. The initial training of a natural language speech recognition engine generally uses a number of "known" words and phrases that the user dictates. The statistical algorithms are modified to match the user's speech patterns. Subsequent modifications of the speech recognition engine may be individualized by corrections entered by a user to transcripts when the transcribed speech is returned incorrect. While any individual user's speech recognition engine is effectively trained to the individual, the training of the language model is inefficient in that common phrases and the like for similarly situated users must be input individually for each installed engine. Moreover, changes that a single user identifies that would be useful for multiple similarly situated users cannot be propagated through the speech recognition system without a new release of the application and database.

While significantly more robust, natural language speech recognition engines generally require training to a particular user's speech patterns, dialect, etc., to function properly, the training is often time consuming and tedious. Moreover, natural language speech recognition engines that are not properly trained frequently operate with mistakes causing frustration and inefficiency for the users. In some cases, this may lead to the user discontinuing the implementation of the natural language speech recognition engine.

Thus, against this background, it is desirable to develop improved apparatuses and methods for deployment and training of natural language speech recognition engines.

SUMMARY

To attain the advantages and in accordance with the purpose of the technology of the present application, methods and apparatuses to facilitate rapid and efficient deployment of speech recognition systems are provided. The methods and apparatuses include providing a pattern matching or grammar based speech recognition engine and a continuous or natural language speech recognition engine in the system. The pattern matching speech recognition engine is initially deployed or active to allow clients to rapidly use the speech recognition system without spending significant time training a user profile associated with a natural language speech recognition engine. During use, the audio for the client is linked to the vocabulary of the pattern matching speech recognition engine. The audio and linked vocabulary is used to train the user profile associated with the natural language speech recognition engine. Once the user profile is sufficiently trained for the natural language speech recognition engine, the natural language speech recognition engine is deployed.

In certain aspects, the technology of the present application determines that the user profile is sufficiently trained based on whether a certain percentage of vocabulary words have been used to train the user profile. In other aspects, the technology requires certain words to be trained to the user profile.

The foregoing and other features, utilities and advantages of the invention will be apparent from the following more particular description of a preferred embodiment of the invention as illustrated in the accompanying drawings.

BRIEF DESCRIPTION OF THE DRAWINGS

Various examples of the technology of the present application will be discussed with reference to the appended drawings. These drawings depict only illustrative examples of the technology and are not to be considered limiting of its scope, which is defined by the claims.

DETAILED DESCRIPTION

The technology of the present application will now be explained with reference to the figures. While the technology of the present application is described with relation to a speech recognition system using both pattern matching and natural language or continuous speech recognition, one of ordinary skill in the art will recognize on reading the disclosure that other applications in which training to a particular user is beneficial are possible. Moreover, the technology of the present application will be described with reference to particular discrete processors, modules, or parts, but one of ordinary skill in the art will recognize on reading the disclosure that processors may be integrated into a single processor or server, or separated into multiple processors or servers. Moreover, the technology of the present application will be described generically and portions of the present application may be loaded onto a particular user's client device (fat or thick client) or hosted by a server that is accessed by the client device (thin client). Additionally, the technology of the present application is described with regard to certain exemplary embodiments. The word "exemplary" is used herein to mean "serving as an example, instance, or illustration." Any embodiment described herein as "exemplary" is not necessarily to be construed as preferred or advantageous over other embodiments. All embodiments described herein should be considered exemplary unless otherwise stated.

Figure 1:
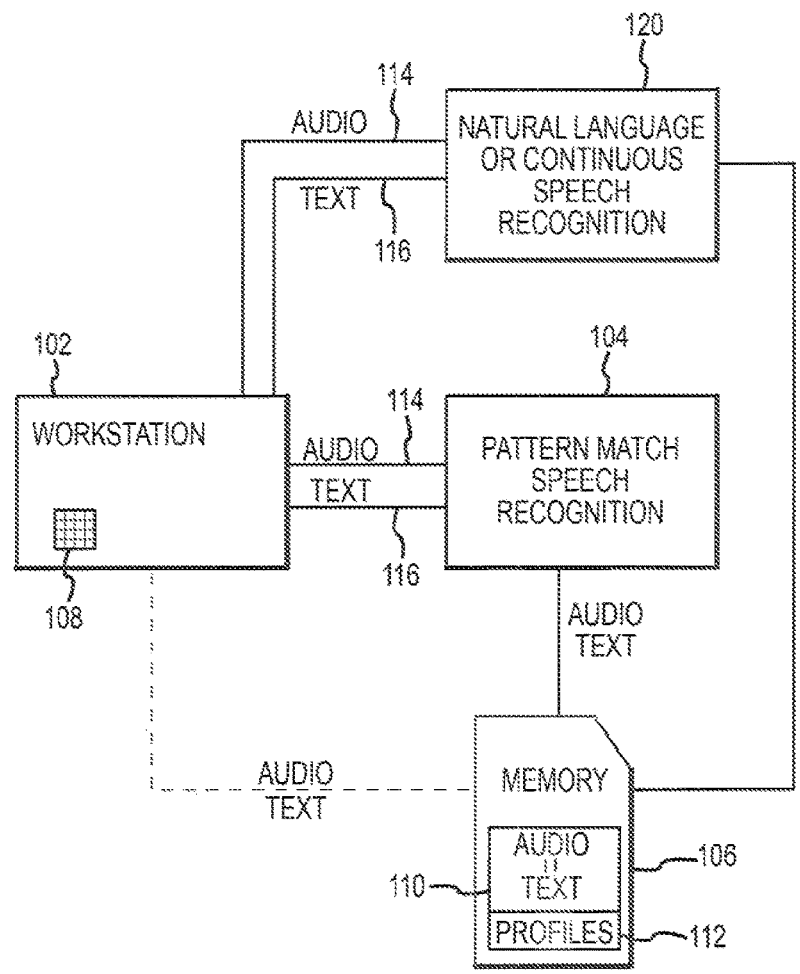
FIG. 1 is a functional block diagram of a speech recognition system consistent with the technology of the present application.

Referring now to FIG. 1, part of a speech recognition system 100 is provided for reference. The speech recognition system 100 shows a client device 102, a pattern matching speech recognition engine 104, and a memory 106. While shown as discrete modules or units, speech recognition system 100 may be incorporated into a single integrated processor. Conversely, the components and modules of speech recognition system 100 may be located remote from each other and connected via a network, whether a private or public network. The client device 102 may be any number of conventional processing devices such as a desktop, laptop, cellular telephone, VoIP enable device, PSTN telephone, smart phone, PDA, mobile device, handheld, tablet, or the like. The client device 102 is configured with a microphone 108, which is shown integrated with client device 102 similar to, for example, a smart phone. However, microphone 108 may similarly be separate and operatively connected to client device 102 via, for example, a universal serial bus or the like. The memory 106 is interconnected with client device 102 and pattern matching speech recognition engine 104. While shown separately, the memory 106 may be remotely located or co-located with the processors or either client device 102 or pattern matching speech recognition engine 104. The memory 104 may store data necessary or convenient for operation of the dictation system. As will be explained further below, the memory 106 may store the audio and text or corrected text for use in training a natural language speech recognition engine in a database 110, the database structure while not necessary provides a convenient visual to link the audio and the text. To facilitate training of the natural language speech recognition engine as will be described below, a portion of memory 106 may include user profiles 112 associated with user(s).

A client uses system 100 by speaking into the microphone 108 only certain defined words that are recognizable by the pattern matching speech recognition engine 104. Generally, these machines would record utterances spoken by a person and convert the audio into a sequence of phonemes. For example, a user's audio of the word "cat" is translated into a sequence of phonemes "k ae t". This phoneme sequence is matched to the standard phoneme set for the word "cat." Thus, the pattern matching speech recognition machine converts the audio file to a machine readable version "cat." In some instances, the administrator of speech recognition system 100 will have particular words, phrases, and the like that are commonly used by clients with client devices 102. These words, which may be referred to as shortcuts, are usable by the client with device 102 when the pattern matching speech recognition engine is active. The audio produced by the client with client device 102 is transmitted as an audio signal 114 to pattern matching speech recognition engine 104. The audio signal may be transmitted by a batch file transfer, a streaming audio signal, or the like. The pattern matching speech recognition engine 104 matches the signal, to a database of particular words or sequences of words. When a match is made, that word sequence 116 is transmitted back to client device 102 for use. The word sequence 116 is data in machine readable format representative of the word. The use may be for population of a user interface field, a database input, a document, a command signal or the like. The audio signal 114 and the word sequence 116 are transmitted to memory 106 for storage in audio/text training database 110. The audio signal 114 and the word sequence 116 may be stored by any conventional means. In certain instances, the client with device 102 may correct the word signal 116. The corrected word or text would be linked to the audio signal and stored in memory 110.

Still with reference to FIG. 1, it can be appreciated that client device 102 also is connected to a natural language or continuous speech recognition engine 120. While shown as separate speech recognition engines, it is expected that pattern matching speech recognition engine 104 and natural language speech recognition engine 120 could be a combined engine with different modes of operation. The client device 102 may have separate input and output ports for access to the natural language speech recognition in certain cases as shown, but the audio signal 114 and word sequence 116 may use the same communication link. The natural language speech recognition engine 120 uses a user profile 112 from memory 106 to modify the language model based on the client's speech patterns, dialect, short cuts, modifications, or the like.

Figure 2:
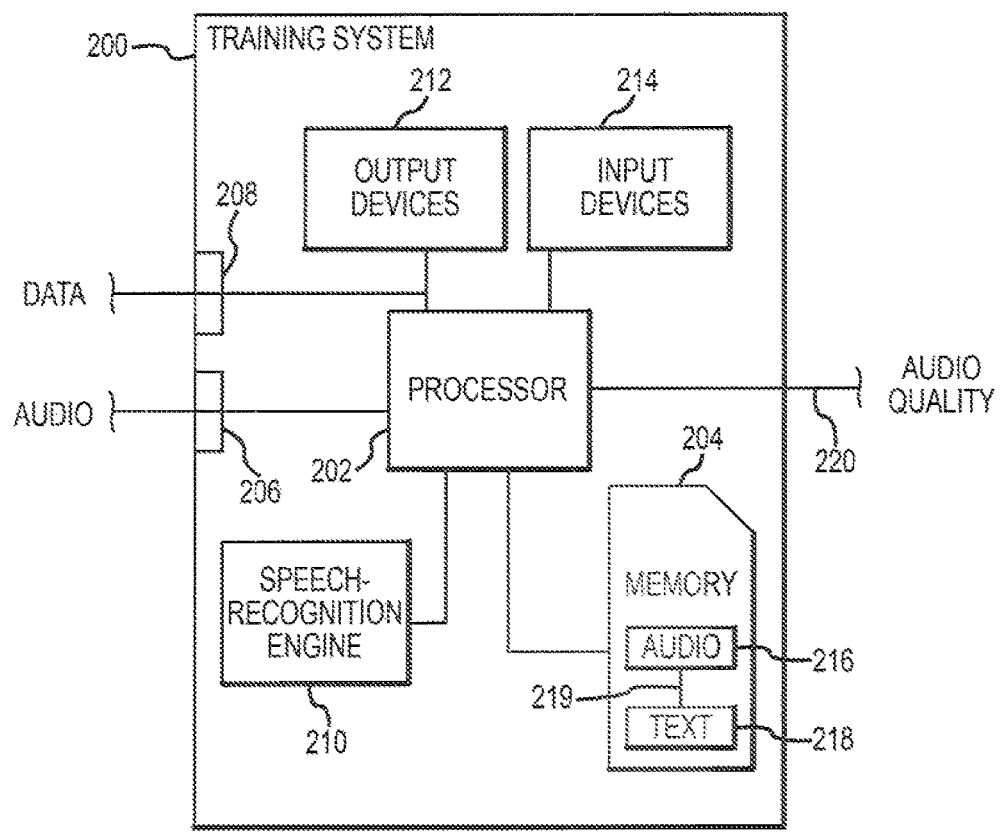
FIG. 2 is a functional block diagram of a training system consistent with the speech recognition system of FIG. 1.

As mentioned above, natural language speech recognition engine 120 needs to be trained for particular users, i.e., the user profile needs to be constructed. Referring now to FIG. 2, a functional diagram of a training system 200 for the natural language speech recognition engine is provided. The training system is described herein for completeness, but is generally understood in the art and will not be explained except as necessary for an understanding of the present application. Training system 200 includes a processor 202, such as for example, a microprocessor, a central processing unit, a desktop computer, a server, a laptop computer, a handheld computer or the like. Processor 202 controls the major functions of the training system 200 including the functional operations described herein below. Processor 202 also processes the various inputs and/or data that may be required to operate training system 200. A memory 204 is interconnected with processor 202. Memory 204 may be remotely located or co-located with processor 202. The memory 204 also may store data necessary or convenient for operation of the training system 200 as will be explained herein. As will be explained, the memory 204 may include memory to store audio and text files to generate corrections and training material as will be explained further below. Training system 200 further includes an audio reception interface 206 or port that can receive or transmit audio information from and to a user, such as, for example, a customer service representative or transcription technician. Training system 200 also includes a data interface 208 or port to receive or transmit data from and to the user.

Interconnected to processor 202 is a speech recognition or speech-to-text engine 210 that converts the audio signal received from the user into a text file or stream that can be returned to the user or further processed as part of the transcription. Speech recognition engine 210 is generally understood in the art and will not be further explained herein. Engine 210 may be provided remote from, integrated with, or co-located with processor 202.

Training system 200 further includes output devices 212, such as, a display, a printer, an email generator, or the like as is conventional in the art to output the results of the training system 200. To facilitate training of the speech recognition engine, as will be explained further below, output device 212 may comprise a speaker and a display. The speaker would play audio files stored in memory 202 and the display would display the associated transcription or text file of the audio stored in memory 202. Training system 200 may further comprise input devices 214. Input device 214 may include any conventional device, but will be described using reference to a conventional keyboard for convenience. Output device 212 and input devices 214 may be co-located or remote from training system 200. In such cases, the audio and text files may be transmitted to a remote location using a conventional or private network connection.

Figure 3:
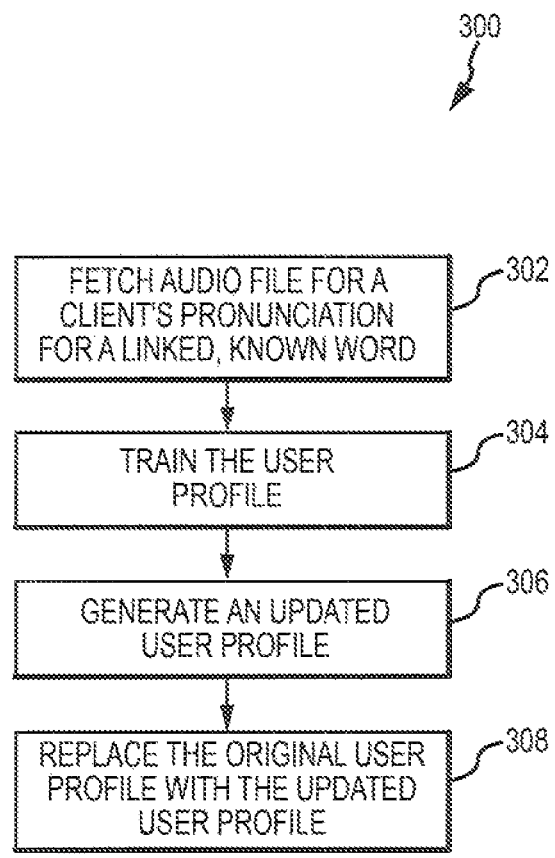
FIG. 3 is a flow chart illustrative of a methodology of training a natural language speech recognition engine consistent with the technology of the present application.

With reference now to FIG. 3, a flow chart 300 is provided illustrative of a methodology of how a user may train a natural language speech recognition engine 120. In this exemplary embodiment, an audio file 216 and a text file 218 of the transcribed audio are available in memory 106 from database 110 linking the pattern matching words, phrases, or the like to audio signals for the user, step 302. In other words, the client's pronunciation and the known word(s) are linked. The database may be imported to memory 204 associated with the training system or simply accessible from memory 106. Using the matched audio to the known correct words or phrases, the processor 202 would train for the user's specific audio, step 304. The training would result in an updated user profile, step 306. The updated user profile would be used to replace the original user profile in memory 106 (database 112), step 308.

Over time, the speech recognition system would phase out the pattern matching recognition engine 104 in favor of the natural language speech recognition engine 120. The transition may be based on an evaluation that the user profile 112 has been trained for a certain number of words, or for a predetermined amount of total audio time, or that each phoneme in the language has been said a predetermined minimum number of times, or that the natural engine can now use the trained profile to transcribe the training audio files with an accuracy above a predetermined threshold. For example, For example, the training text may be drawn from a corpus of words, phrases, or sentences which are known to include all the phonemes in the language and a user supplies the audio for these phrases so that a profile can be constructed for his voice.

The conversion from the pattern matching recognition engine 104 to the natural language recognition engine 120 may be a hard break wherein the pattern matching recognition engine is no longer used and only the natural language recognition engine 120 is used. However, the conversion may be a gradual process where the natural language speech recognition engine 120 is phased in while the pattern matching recognition engine is phased out. For example, when initially implementing the natural language functionality, the pattern matching recognition may be the primary recognition engine, but if the audio is not matched by the pattern matching recognition engine, the audio is subsequently transcribed by the natural language recognition engine. Alternatively, the natural language recognition engine may be primary and the pattern matching recognition engine secondary. In still other embodiments, the pattern matching recognition engine may be selected for certain tasks and the natural language recognition engine for other tasks. Additionally, the natural language recognition engine may initially be used only for a limited vocabulary until additional training of the user profile (and possibly the client) is accomplished.

Figure 4:
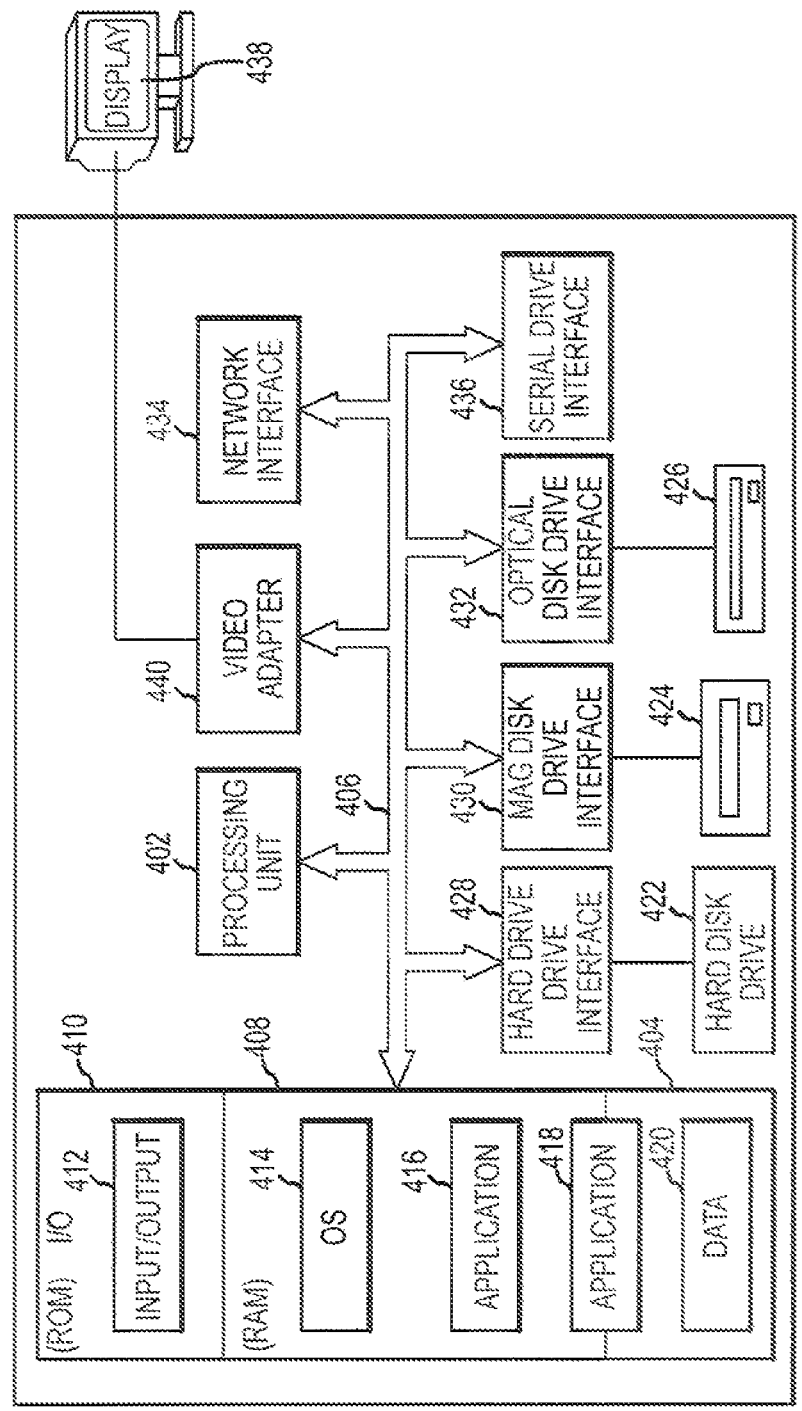
FIG. 4 is functional block diagram of a client device consistent with the technology of the present application.

Referring now to FIG. 4, a functional block diagram of a typical client device 400 for the technology of the present application is provided. Client device 400 is shown as a single, contained unit, such as, for example, a desktop, laptop, handheld, or mobile processor, but client device 400 may comprise portions that are remote and connectable via network connection such as via a LAN, a WAN, a WLAN, a WiFi Network, Internet, or the like. Generally, client device 400 includes a processor 402, a system memory 404, and a system bus 406. System bus 406 couples the various system components and allows data and control signals to be exchanged between the components. System bus 406 could operate on any number of conventional bus protocols. System memory 404 generally comprises both a random access memory (RAM) 408 and a read only memory (ROM) 410. ROM 410 generally stores a basic operating information system such as a basic input/output system (BIOS) 412. RAM 408 often contains the basic operating system (OS) 414, application software 416 and 418, and data 420. System memory 404 contains the code for executing the functions and processing the data as described herein to allow the present technology of the present application to function as described. Client device 400 generally includes one or more of a hard disk drive 422 (which also includes flash drives, solid state drives, etc. as well as other volatile and non-volatile memory configurations), a magnetic disk drive 424, or an optical disk drive 426. The drives also may include zip drives and other portable devices with memory capability. The drives are connected to the bus 406 via a hard disk drive interface 428, a magnetic disk drive interface 430 and an optical disk drive interface 432, etc. Application modules and data may be stored on a disk, such as, for example, a hard disk installed in the hard disk drive (not shown). Client device 400 has network connection 434 to connect to a local area network (LAN), a wireless network, an Ethernet, the Internet, or the like, as well as one or more serial port interfaces 436 to connect to peripherals, such as a mouse, keyboard, modem, or printer. Client device 400 also may have USB ports or wireless components, not shown. Client device 400 typically has a display or monitor 438 connected to bus 406 through an appropriate interface, such as a video adapter 440. Monitor 438 may be used as an input mechanism using a touch screen, a light pen, or the like. On reading this disclosure, those of skill in the art will recognize that many of the components discussed as separate units may be combined into one unit and an individual unit may be split into several different units. Further, the various functions could be contained in one personal computer or spread over several networked personal computers. The identified components may be upgraded and replaced as associated technology improves and advances are made in computing technology. The speech recognition engines may have similar constructions.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. The above identified components and modules may be superseded by new technologies as advancements to computer technology continue.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

We claim:

1. A method performed on at least one processor for training a user profile for a second speech recognition engine, the method comprising the steps of:
    providing, to the at least one processor, an audio file wherein the audio file contains a pronunciation of a client;
    recognizing, by the at least one processor, the audio file as text data using a first speech recognition engine of a first type wherein the first type is selected from a group of speech recognition engines consisting of: a pattern match speech recognition engine, a natural language speech recognition engine, or a combination thereof;
    linking, by the at least one processor, the audio file and the text data; and
    training, by the at least one processor, a user profile of a second speech recognition engine of a second type, wherein the second type is different from the first type and is selected from a group of speech recognition engines consisting of: a pattern match speech recognition engine, a natural language speech recognition engine, or a combination thereof, using the linked audio file and text data, wherein the user profile of the second speech recognition engine is trained using audio recognized by the first speech recognition engine;
    converting the recognition engine from the first speech recognition engine to the second speech recognition engine;
    wherein the converting step comprises the step of evaluating, based on a predetermined parameter, that the user profile of the second speech recognition engine is trained;
    wherein the predetermined parameter is that each phoneme of a language has been spoken a number of times.

2. The method of claim 1 wherein the first speech recognition engine is not a continuous speech recognition engine.

3. The method of claim 1 wherein the predetermined parameter is that a predetermined percentage of words in the first recognition engine vocabulary are trained.

4. The method of claim 1 wherein the predetermined parameter is that a plurality of phonemes have been spoken a number of times.

5. The method of claim 1 wherein the predetermined parameter is that a client has used the first recognition engine a predetermined number of hours.

6. The method of claim 1 wherein the conversion step comprises:
ceasing operation of the first recognition engine; and
commencing operation of the second speech recognition engine.

7. The method of claim 1 wherein the conversion step comprises:
phasing out the operation of the first recognition engine; and
phasing in the operation of the second speech recognition engine.

8. An apparatus for speech recognition comprising:
a first speech recognition engine of a first type, the first speech recognition engine to receive audio from a client and match the received audio to text wherein the first type is selected from a group of speech recognition engines consisting of: a pattern match speech recognition engine, a natural language speech recognition engine, or a combination thereof;
a memory coupled to the first speech recognition engine to store the received audio and the text, the memory configured to store a user profile;
a second speech recognition engine of a second type, the second speech recognition engine coupled to the memory and capable of fetching at least the user profile, wherein the second type is different from the first type and is selected from a group of speech recognition engines consisting of: a pattern match speech recognition engine, a natural language speech recognition engine, or a combination thereof;
a training system, the training system coupled to the memory and the second speech recognition engine, wherein the training system uses the received audio and the text to train the user profile;
converting the recognition engine from the first speech recognition engine to the second speech recognition engine;
wherein the converting step comprises the step of evaluating, based on a predetermined parameter, that the user profile of the second speech recognition engine is trained;
wherein the predetermined parameter is that each phoneme of a language has been spoken a number of times.

9. The apparatus of claim 8 wherein the first speech recognition engine is a pattern matching recognition engine and the second speech recognition engine is a natural language speech recognition engine.

10. The apparatus of claim 8 wherein the predetermined parameter is that a predetermined percentage of the pattern matching speech recognition engine vocabulary has been trained.

11. The apparatus of claim 8 wherein the predetermined parameter is that a plurality of phonemes have been spoken a number of times.

12. The apparatus of claim 8 wherein the predetermined parameter is that the first speech recognition engine has been used a predetermined amount of time.

\* \* \* \* \*